June 24, 1947.  C. H. JOHNSON  2,422,785
AIR CHUCK
Filed Dec. 21, 1943   3 Sheets-Sheet 1

Charles H. Johnson
INVENTOR.

BY *Plwin C. Andrus*
ATTORNEY.

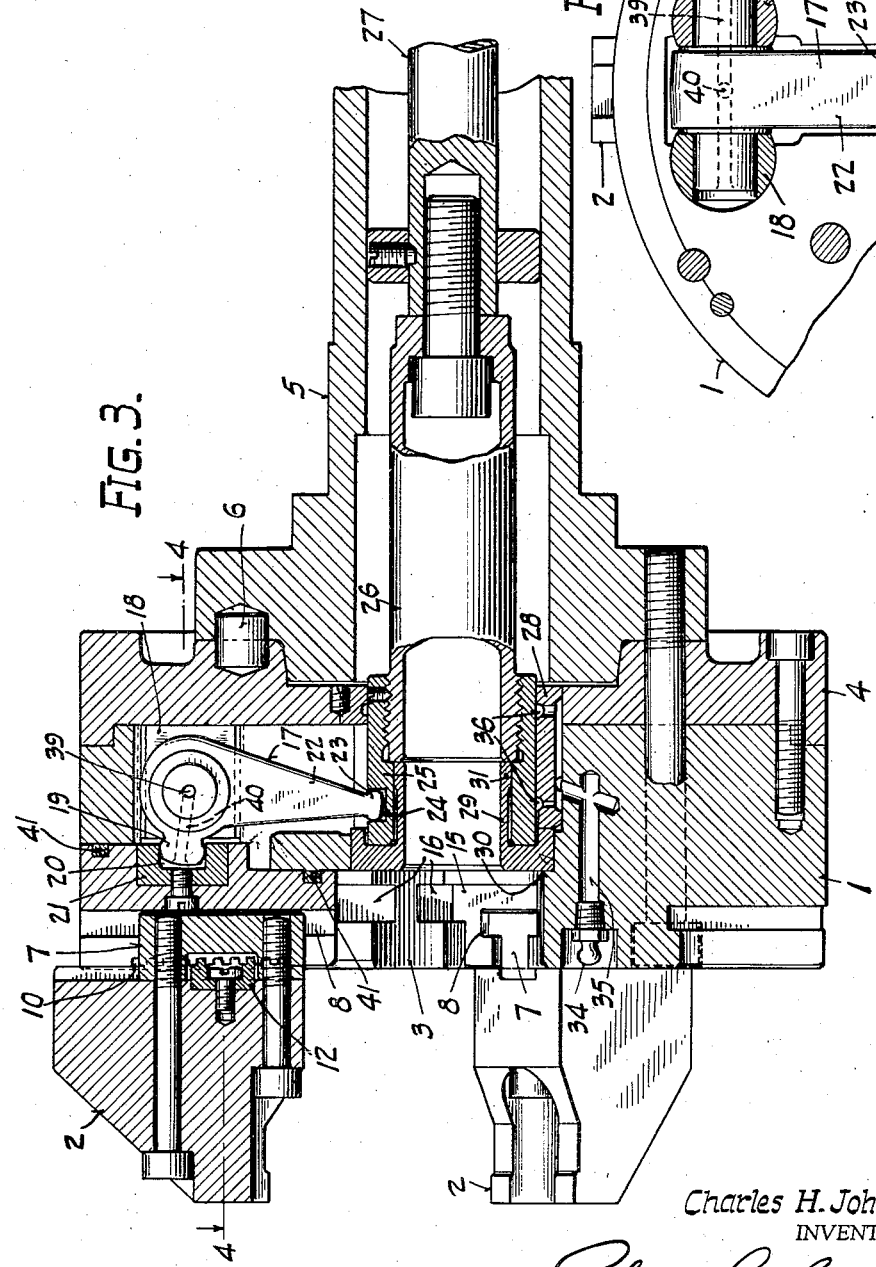

June 24, 1947.    C. H. JOHNSON    2,422,785
AIR CHUCK
Filed Dec. 21, 1943    3 Sheets-Sheet 3
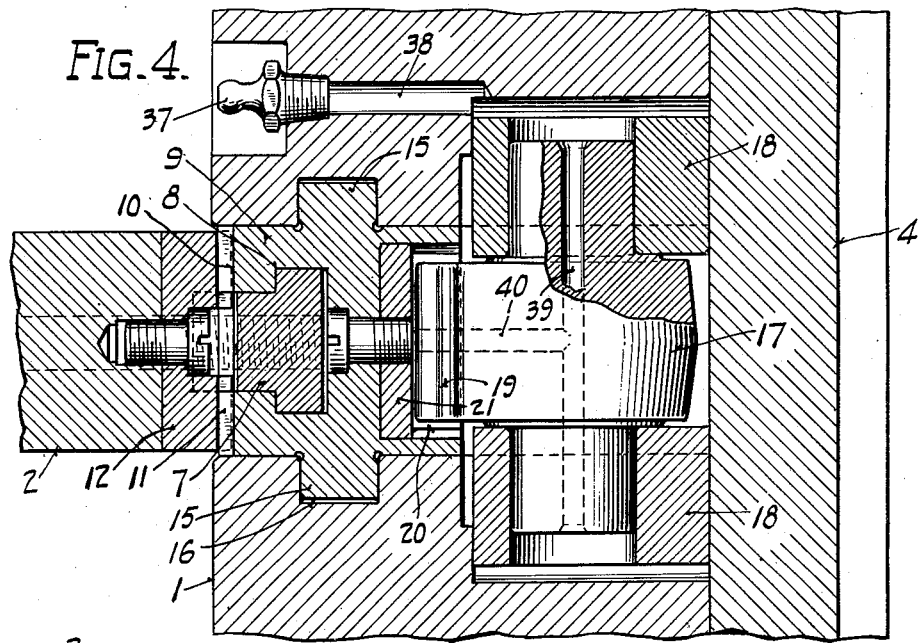
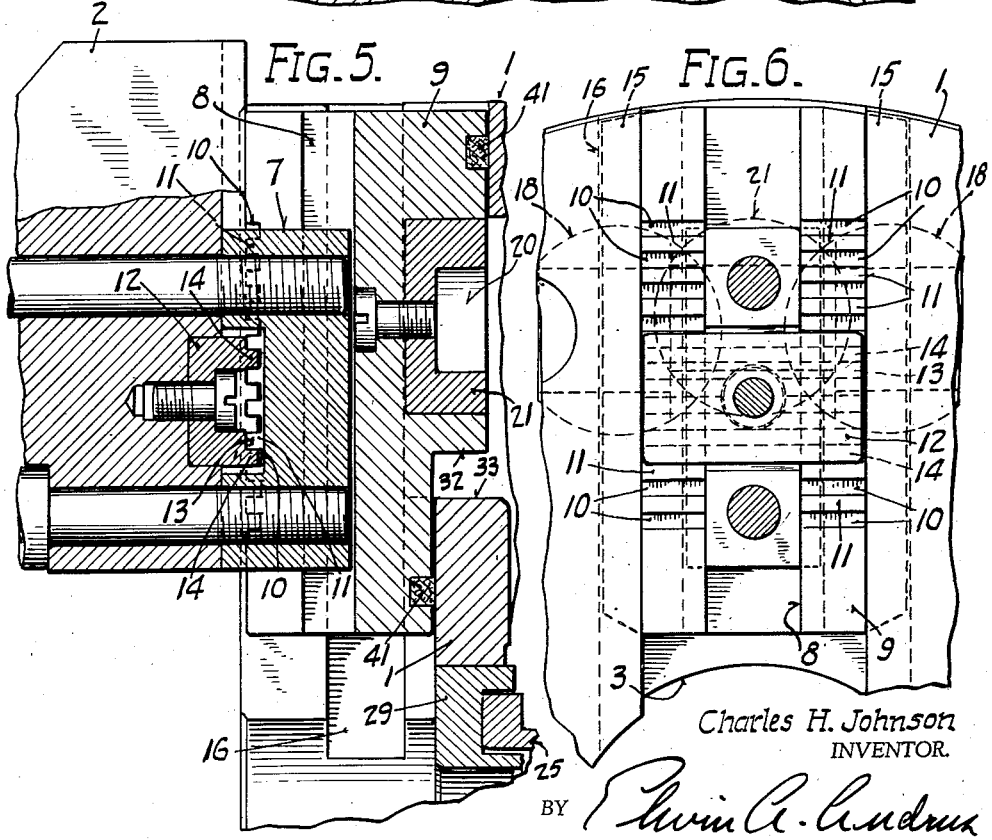
Charles H. Johnson
INVENTOR.
BY
ATTORNEY.

Patented June 24, 1947

2,422,785

UNITED STATES PATENT OFFICE 2,422,785

AIR CHUCK

Charles H. Johnson, Madison, Wis., assignor to Gisholt Machine Company, Madison, Wis., a corporation of Wisconsin Application December 21, 1943, Serial No. 515,123

9 Claims. (Cl. 279—119)

This invention relates to an air chuck for a machine tool and the like. The chuck gets its name from the fact that it is usually operated by an air cylinder, although the actuating mechanism constitutes no part of the invention and the chuck may be operated by any suitable means.

The principal object of the invention is to provide a chuck of considerably greater strength for its size and weight and adapted for use on modern high speed lathes and where multiple tools are employed.

Another object of the invention is to provide a chuck in which the working parts are better protected from metal chips and foreign material and more adequately lubricated.

Another object is to provide a chuck with greater clearance space between the jaws for receiving special tools and odd shaped work pieces.

Another object is to eliminate pockets that tend to collect chips and ultimately jam and prevent the proper operation of the jaws.

The chuck illustrated in the accompanying drawings embodies the several features of the invention.

In the drawings:

Fig. 3 is a vertical central section taken on line 3—3 of Fig. 1;

Fig. 4 is a detail transverse section taken through one of the jaws on line 4—4 of Fig. 3;

Fig. 5 is a detail vertical section showing the manner of attachment of the jaw to the slides;

Fig. 6 is a detail view showing the front of the slide with the jaw removed; and Fig. 7 is a rear elevation showing the back of an operating lever, with the rear cover plate removed and the bearings and operating sleeve sectioned.

Figure 2:
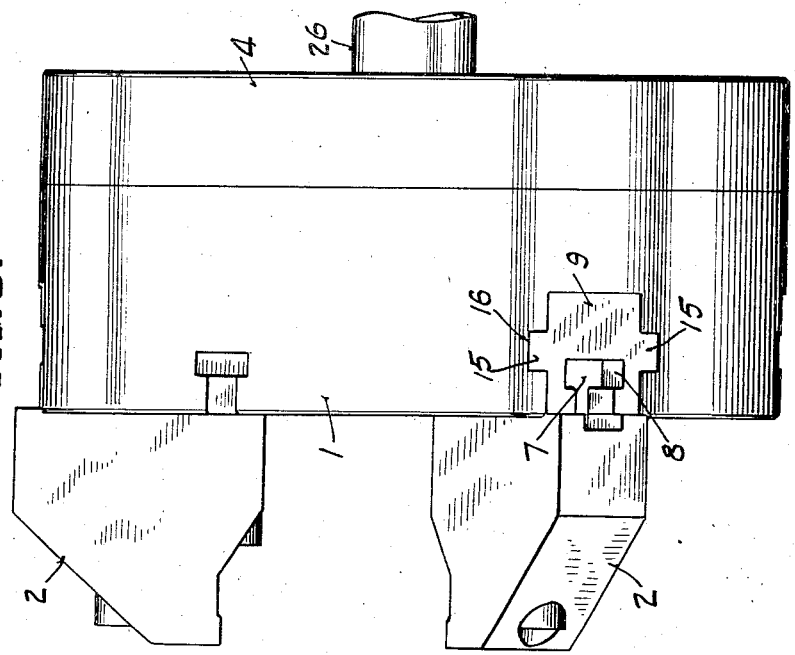
Fig. 2 is a side elevation of the chuck.
Figure 1:
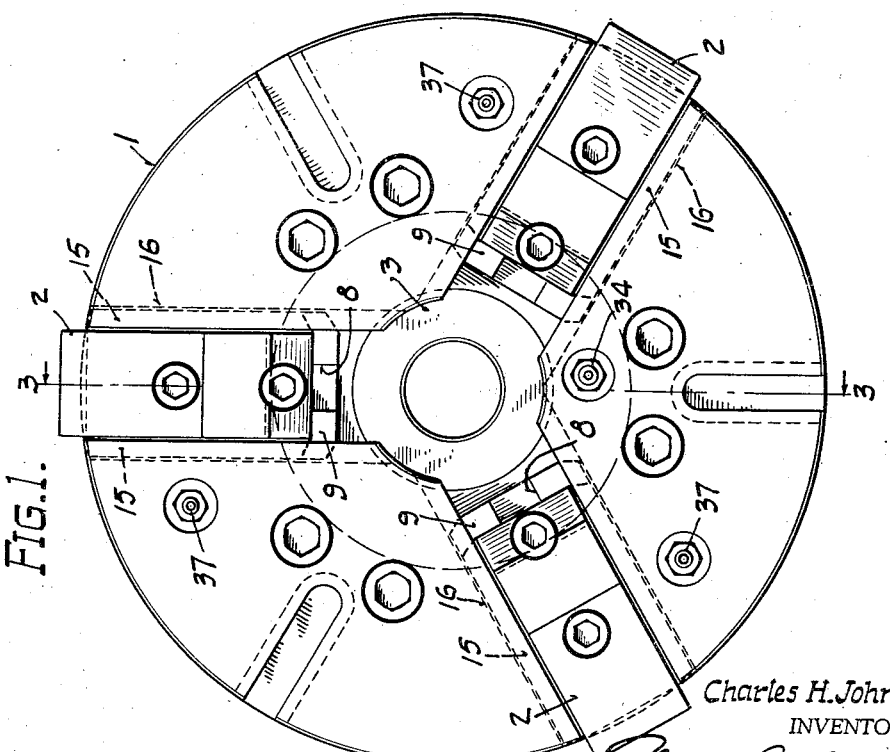
Figure 1 is an end elevation of the chuck.

The chuck comprises in general a chuck body 1 and a plurality of radially movable jaws 2 on its face for gripping a work piece.

The chuck body 1 is cylindrical and has a central opening 3 therethrough. The body and back plate or base 4 are permanently bolted together when the chuck is assembled in the factory. The entire chuck assembly is bolted as a unit to the end of the rotating spindle 5 of a lathe or the like. A drive pin 6 is disposed in complementary registering recesses in the adjoining faces of the base 4 and spindle 5.

The chuck jaws 2 protrude forwardly from the face of the chuck body and are bolted to a T-clamp 7 longitudinally adjustable in a radial T-slot 8 in a jaw base 9. The jaw base 9 has its top surface on either side of the T-slot 8 provided with a series of transverse jaw grooves 10 with intermediate gear-like teeth 11. A cross tongue or insert 12 is removably secured in a recess in the jaw 2 and has similar grooves 13 and teeth 14 in its face meshing with and complementary to the grooves 10 and teeth 11 of the jaw base. By loosening the bolts that secure the jaw 2 to its clamp 7, the teeth 14 can be disengaged from grooves 10 and the jaw adjusted inwardly or outwardly along the jaw base 9 and then reclamped in any desired position of intermesh of the teeth and grooves.

The insert 12 has its grooves 13 and teeth 14 off center longitudinally of the insert, there being a tooth 14 at one end and a groove 13 at the other. This construction enables the insert 12 to be turned around, through 180°, and to effect adjustment of the jaw either radially outward or inward a distance of only one-half of the tooth spacing. This feature is of particular importance with the short stroke chuck illustrated since it enables better adjustment of the jaws where the distance of the stroke or movement of a jaw is only about the same as the spacing of the teeth.

The jaw base 9 has tongues 15 riding in the opposite extremities of a T-shaped slot 16 in the face of the chuck body 1. The slot 16 is disposed radially in the body 1 so as to guide the movement of the jaw base 9 and its jaw 2 radially toward and away from the piece to be gripped.

The actuation of jaw base 9 is effected by a bell crank lever 17 disposed in a recess in the back of the chuck body 1. The bell crank lever 17 has a solid trunnion-like body. The trunnions of the bell crank lever are pivoted in circular bearing blocks 18 slid into holes in the chuck body 1 from the rear and held in place by the base 4.

The bearing blocks 18, by reason of their circular shape, can tilt or rotate on an axis at right angles to the axis of the trunnions and allow for any tolerances in their construction. The trunnions and lever are free from strain that might otherwise be imposed on them.

In former construction the levers had a hole through them and a pivot pin was inserted therethrough and disposed in a transverse hole in the body of the chuck. With this former construction the levers were almost always strained in assembly due to misalignments, and they were so weakened by the hole for the pivot pin that they could not take the loads now required without breaking.

The present construction eliminates this difficulty and where the levers have integral trunnions mounted in self-adjusting bearing blocks, as described, the levers are capable of withstanding loads several times greater than the former levers could.

The short arm of the lever 17 constitutes a curved forwardly protruding knob 19 which fits into a recess 20 in a hardened circular insert 21 in the back of jaw base 9.

The insert 21 is circular to provide for its rotation to accommodate possible tilting of the short arm 19 arising from tolerances or inaccuracies in the construction or mounting of the lever 17.

The long arm 22 of lever 17 extends radially inward and terminates in a curved knob-like end 23 fitting into a recess 24 in the tubular slider 25. The slider 25 is disposed for longitudinal movement axially of the chuck and is threaded onto the end of a draw sleeve 26. The draw sleeve is connected to the piston of an air chuck or other operating mechanism at the opposite end of the spindle 5 by means of a draw rod 27 extending through the hollow spindle.

The slider 25 is mounted in a bushing 28 inside the chuck body 1 and base 4. A slider seal 29 is held against a shoulder 30 in the body 1 by the bushing 28 and has a portion 31 extending inside the slider 25 to seal the same against oil leakage. The portion 31 of slider seal 29 is relatively thin with an oversized end fitting reasonably tight against the slider 25 at all times.

The slider seal 29 also serves as an end stop for determining the movement of the draw sleeve 26 in the direction that effects movement of the jaw bases 9 and their attached jaws 2 radially outward. This stop functions without placing any strain on the levers. The inward movement of jaw bases 9 is limited in cases of emergency by an abutment of the shoulders 32 of the jaw bases against corresponding opposed shoulders 33 on the body 1.

Oil is fed to the moving parts through the nipple 34 and passages 35 in body 1, leading to oil grooves 36 in bushing 28. The oil first lubricates the surfaces of slider 25 and passes thence into the recesses containing levers 17 where it is outwardly thrown by centrifugal force to lubricate the trunnion pivots of levers 17 in bearing blocks 18. Additional lubrication for the trunnions of levers 17 is provided by oil nipple 37 leading to passage 38 in body 1 which conducts the oil to the end of one trunnion and thence by central oil passage 39 through the trunnion to the end of the opposite trunnion. A radial passage 40 extends from passage 39 to the end of knob 19 to effect oiling of the short arm of the lever in insert 21.

Oil is prevented from leaking out past the jaw bases 9 by means of felt strips 41 at either end of the bases and engaging the body 1.

The construction of the body 1, jaw bases 9 and slider seal 29 prevents access of metal chips to the working parts of the chuck. The mounting of the jaws 2 is such as to provide a substantial radial space between the jaws for receiving odd shaped pieces to be gripped. The hollow center of the chuck provides for the reception of a piloted boring bar which may have a pilot centered therein for giving added support to a cutting tool or the like.

One of the features of the present invention lies in the construction of the levers 17. By constructing these levers with integral solid trunnions for pivoting the same in the bearing blocks 18, a much stronger lever mechanism is provided than heretofore. Levers which are bored out to receive separate pivot pins passing therethrough have been found to be inherently weak. This feature, perhaps more than any other, has been responsible for the ability of the chuck of the present invention to carry cutting loads and operate at speeds heretofore considered impossible for the same size of chuck.

Another feature of the invention lies in the enclosing of the operating mechanism against entry of chips, and the seals provided to insure proper lubrication of the working parts. The stops for the movement of the jaws are inside and protected from becoming jammed with chips and the like.

Various embodiments of the invention may be employed within the scope of the accompanying claims.

The invention is claimed as follows:

1. In a chuck of the class described, a chuck body, a plurality of radially movable jaws mounted on the face thereof, said body having circumferentially spaced recesses for receiving bearing blocks in its rear face behind the respective jaws and opening thereto, levers insertable in corresponding recesses from the rear for actuating the respective jaws, said levers having integral trunnions for pivotally mounting the same, and bearing blocks for assembly with said trunnions and having a circular external contour on an axis at right angles to the axis of the trunnions to fit into complementary recesses of the chuck body and provide for self-adjustment of the bearing blocks to compensate for misalignment and inaccuracies of the trunnions and levers.

2. In a chuck of the class described, a chuck body, a plurality of spaced jaw bases mounted in radially extending slots in the face of said body and interlocked therein, each of said jaw bases having a longitudinal slot in its outer face with the edges of the slot overhanging a portion thereof and having transverse jaw grooves in its face, a clamp nut adjustable longitudinally in said latter slot, a top jaw bolted to said clamp nut, and a cross tongue recessed into and secured to the back of each jaw, said cross tongue having transverse grooves which interlock in tongue and groove engagement with the faces of the jaw base on either side of the slot therein, and said cross tongues being reversible and having their tongue and groove contour off center to provide for intermediate adjustment of the top jaws, the total movement of said top jaws on the jaw bases being of the order of the spacing of the tongue and groove interlock.

3. In a chuck of the class described, a chuck body, a plurality of jaw actuating levers disposed therein and having short curved knob-like arms extending toward the face of the body in openings provided therefor, a jaw base mounted for radial movement on said face and covering each said opening, and a hardened wear resistant circular metal insert secured in the back of said jaw base and having a transverse diametric recess therein for receiving the respective arm of a corresponding operating lever to effect radial movement of the jaw base relative to said body by the operation of said lever, said circular metal inserts being adapted to adjust themselves rotatably to the transverse arms of the corresponding levers.

4. In a chuck of the class described, a chuck body having an axial opening therein, a plurality of jaws mounted on the face of said body for cooperative radial operating movements, said chuck body having a recess in its rear surface opening to each of said jaws, an actuating member axially movable in said opening of the chuck body, and a lever disposed in each recess and having integral opposed trunnions of substantial size pivoted in said chuck body to effect operation of said jaws from said actuating member, said levers being individually removable from said recesses without removal of the corresponding jaws.

5. In a chuck of the class described, a rotary cylindrical chuck body, a plurality of radially movable jaws mounted on the face thereof, said body having a pair of circular recesses therein behind each jaw, levers insertable in spaces between corresponding recesses of each pair for actuating the respective jaws and having pivotal trunnions for mounting the same for operative movement in bearing blocks, and bearing blocks having a circular external contour on an axis at right angles to the axis of the trunnions and adapted to fit into the corresponding recesses of the chuck body and provide for self-adjustment of the bearing blocks to compensate for misalignment and inaccuracies of the trunnions and levers.

6. In a chuck of the class described, a rotary chuck body, a plurality of jaw actuating levers independently pivotally mounted therein to be operated in unison and having short curved knob-like arms extending toward the face of the body in openings provided therefor, jaw bases mounted for radial movement on said face and covering corresponding openings to be operated by the respective levers, and a hardened wear resistant metal insert in the back of each said jaw base and having a slot-like recess therein for receiving the respective arm of a lever and having a circular outer contour to provide for rotation thereof in the jaw base on an axis substantially at right angles to the pivotal axis of the corresponding lever to accommodate the location and transverse direction of the knob-like arm of the lever therein.

7. In a chuck of the class described, a cylindrical chuck body, a plurality of radially movable jaws mounted on the front face thereof, said body having separate circumferentially spaced recesses in its rear face behind said jaws for housing corresponding actuating levers with openings in its front face for connecting the levers with the respective jaws, said jaws closing the front openings in the body, a jaw actuating lever disposed in each recess and pivoted in said body, said levers being individually removable from said recesses to the rear of the chuck body without removal of the corresponding jaw, and a back plate secured to the rear face of the body for closing said recesses to the rear.

8. In a chuck of the class described, a cylindrical chuck body, a plurality of radially movable jaws mounted on the front face thereof, said body having a recess in its rear face behind each jaw and opening thereto, a lever in each recess for actuating the corresponding jaw, bearing blocks for assembly with pivotal trunnions of each of said levers and supported by walls of said recess, each lever and bearing block assembly being individually insertable in and removable from the corresponding recess at the rear of the chuck body without removal of the corresponding jaw, and a cover plate secured to the rear face of the body for holding said bearing blocks and levers in place.

9. In a chuck of the class described, a rotary cylindrical chuck body, a plurality of radially movable jaws mounted on the front face thereof, said body having a recess in its rear surface behind each jaw and opening thereto, levers in said recesses for actuating corresponding jaws and having pivotal trunnions for mounting the same for operative movement therein, and circular automatically adjustable bearing blocks for assembly with said pivotal trunnions and supported by walls of said recesses, each lever and bearing block assembly being individually insertable in and removable from the corresponding recess at the rear of the chuck body without removal of the corresponding jaw.

CHARLES H. JOHNSON.

REFERENCES CITED

The following references are of record in the file of this patent:

UNITED STATES PATENTS

| Number | Name | Date |
|---|---|---|
| 1,711,787 | Hopkins | May 7, 1929 |
| 1,837,174 | Sloan et al. | Dec. 15, 1931 |
| 1,713,978 | Olson | May 21, 1929 |
| 1,999,032 | Burger et al. | Apr. 23, 1935 |
| 1,108,798 | Schultis | Aug. 25, 1914 |
| 1,465,820 | Hay | Aug. 21, 1923 |
| 2,224,639 | Ward | Dec. 10, 1940 |